US010778778B1

(12) United States Patent
Blanksteen

(10) Patent No.: US 10,778,778 B1
(45) Date of Patent: Sep. 15, 2020

(54) RESPONSE ENDPOINT SELECTION BASED ON USER PROXIMITY DETERMINATION

(71) Applicant: Amazon Technologies, Inc., Seattle, WA (US)

(72) Inventor: Scott Ian Blanksteen, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 669 days.

(21) Appl. No.: 15/049,914

(22) Filed: Feb. 22, 2016

Related U.S. Application Data

(63) Continuation of application No. 13/715,741, filed on Dec. 14, 2012, now Pat. No. 9,271,111.

(51) Int. Cl.
*H04L 29/08* (2006.01)
(52) U.S. Cl.
CPC .................. *H04L 67/14* (2013.01)
(58) Field of Classification Search
CPC ..... H04W 72/048; H04W 4/02; H04W 4/025; H04W 4/028; H04W 4/043; H04L 67/14
See application file for complete search history.

(56) References Cited

U.S. PATENT DOCUMENTS

| | | | |
|---|---|---|---|
| 5,255,341 A * | 10/1993 | Nakajima | B66B 1/468 340/573.1 |
| 5,493,692 A * | 2/1996 | Theimer | G06Q 10/107 340/5.74 |
| 5,862,321 A * | 1/1999 | Lamming | G06F 15/0225 358/403 |
| 5,928,325 A * | 7/1999 | Shaughnessy | G06Q 10/107 709/206 |
| 6,587,835 B1 | 7/2003 | Treyz et al. | |
| 7,084,997 B2 * | 8/2006 | Clough | G06F 3/1204 358/1.13 |
| 7,418,392 B1 | 8/2008 | Mozer et al. | |

(Continued)

FOREIGN PATENT DOCUMENTS

| | | |
|---|---|---|
| JP | 2003116175 | 4/2003 |
| WO | WO2011088053 | 7/2011 |

OTHER PUBLICATIONS

European Office Action dated Sep. 29, 2017 for European Patent Application No. 13861696.6, a counterpart foreign application of U.S. Pat. No. 9,271,111, 9 pages.

(Continued)

*Primary Examiner* — Lance Leonard Barry
(74) *Attorney, Agent, or Firm* — Pierce Atwood LLP

(57) ABSTRACT

A computer-implemented method involves receiving a request corresponding to input provided by a user and generating first data associated with a response to the request. Second data associated with a proximity of the user to the first computing device may be received from the first computing device, and third data associated with a proximity of the user to the second computing device may be received from the second computing device. Based at least on the second data and the third data, it may be determined that the user is closer to the first computing device than to the second computing device. Based at least in part on the user being closer to the first computing device than to the second computing device, it may be determined that the response is to be sent to the first computing device.

27 Claims, 7 Drawing Sheets

(56) References Cited

U.S. PATENT DOCUMENTS

| | | | | |
|---|---|---|---|---|
| 7,522,608 | B2* | 4/2009 | Samdadiya | H04L 29/06027 370/392 |
| 7,673,010 | B2* | 3/2010 | Bennett | H04M 3/42263 709/213 |
| 7,720,683 | B1 | 5/2010 | Vermeulen et al. | |
| 7,774,204 | B2 | 8/2010 | Mozer et al. | |
| 7,920,679 | B1* | 4/2011 | Naim | H04M 3/5116 379/45 |
| 8,166,119 | B2* | 4/2012 | Ligh | G06F 3/04886 709/206 |
| 8,179,899 | B2* | 5/2012 | Samdadiya | H04L 29/06027 370/392 |
| 8,332,544 | B1* | 12/2012 | Ralls | A63F 13/92 340/573.1 |
| 8,484,344 | B2* | 7/2013 | Butterfield | H04M 3/42382 709/202 |
| 8,775,103 | B1* | 7/2014 | Jayaraj | H03K 17/955 702/57 |
| 9,264,850 | B1* | 2/2016 | Lee | H04W 4/023 |
| 9,460,237 | B2* | 10/2016 | Nguyen | G06Q 10/10 |
| 2004/0019603 | A1 | 1/2004 | Haigh et al. | |
| 2005/0043940 | A1 | 2/2005 | Elder | |
| 2005/0125541 | A1* | 6/2005 | Frank | H04L 51/04 709/227 |
| 2009/0119264 | A1 | 5/2009 | Bostic et al. | |
| 2010/0250727 | A1* | 9/2010 | King | G01S 5/0027 709/224 |
| 2011/0178969 | A1 | 7/2011 | Falchuk et al. | |
| 2012/0223885 | A1 | 9/2012 | Perez | |
| 2012/0238248 | A1* | 9/2012 | Jonsson | G06Q 10/1095 455/413 |
| 2012/0297305 | A1* | 11/2012 | Hehmeyer | H04L 51/043 715/733 |
| 2012/0310391 | A1* | 12/2012 | Sanders | G06F 3/011 700/94 |
| 2013/0297704 | A1* | 11/2013 | Alberth, Jr. | H04L 67/303 709/205 |
| 2014/0052681 | A1* | 2/2014 | Nitz | H04L 51/02 706/46 |
| 2014/0057667 | A1* | 2/2014 | Blankenship | H04L 67/303 455/500 |
| 2014/0164088 | A1* | 6/2014 | Rorabaugh | G06Q 30/0226 705/14.27 |
| 2014/0172953 | A1 | 6/2014 | Blanksteen | |

OTHER PUBLICATIONS

Japanese Office Action dated Nov. 8, 2017 for Japanese Patent Application No. 2015-544158, a counterpart foreign application of U.S. Pat. No. 9,271,111.

Office Action for U.S. Appl. No. 13/715,741, dated Jan. 23, 2015, Scott Ian Blanksteen, "Response Endpoint Selection", 11 pages.

Final Office Action for U.S. Appl. No. 13/715,741, dated Jun. 23, 2015, Scott Ian Blanksteen, "Response Endpoint Selection", 9 pages.

PCT Search Report and Written Opinion dated May 12, 2014, for PCT Application No. PCT/US13/71488, 8 Pages.

Pinhanez, "The Everywhere Displays Projector: A Device to Create Ubiquitous Graphical Interfaces", IBM Thomas Watson Research Center, Ubicomp 2001, 18 pages.

Japanese Office Action dated Aug. 7, 2018 for Japanese Patent Application No. 2015-544158, a counterpart foreign application of U.S. Pat. No. 9,271,111.

Extended European Search Report dated Jul. 1, 2016 for European Patent Application No. 13861696.6, 10 pages.

Translated Japanese Office Action dated Jan. 31, 2017 for Japanese Patent Application No. 2015-544158, a counterpart foreign application of U.S. Appl. No. 13/715,741, 10 pages.

Translated Japanese Office Action dated Aug. 2, 2016 for Japanese Patent Application No, 2015-544158, a counterpart foreign application of U.S. Appl. No. 13/715,741, 9 pages.

Translated Chinese Office Action dated Apr. 12, 2017 for Chinese Patent Application No. 201380063208.1, a counterpart foreign application of U.S. Pat. No. 9,271,111, 26 pages.

European Office Action dated Apr. 13, 2017 for European Patent Application No. 13861696.6, a counterpart foreign application of U.S. Pat. No. 9,271,111, 11 pages.

* cited by examiner

RESPONSE ENDPOINT SELECTION BASED ON USER PROXIMITY DETERMINATION

This application is a Continuation Application of application Ser. No. 13/715,741, now U.S. Pat. No. 9,271,111, filed on Dec. 14, 2012, which is incorporated by reference herein in its entirety.

BACKGROUND

Homes, offices and other places are becoming more connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, gesture, and even through natural language input such as speech.

As computing devices evolve, users are expected to rely more and more on such devices to assist them in routine tasks. Today, it is commonplace for computing devices to help people buy tickets, shop for goods and services, check the weather, find and play entertainment, and so forth. However, with the growing ubiquity of computing devices, it is not uncommon for users to have many devices, such as a smartphone, e-book reader, a tablet, a computer, an entertainment system, and so forth. One of the challenges for multi-device users is how to perform tasks effectively when working with multiple devices. Coordinating a task among multiple devices is non-trivial.

Accordingly, there is a need for techniques to improve coordination of user activity in a ubiquitous computing device environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 includes a functional block diagram of select components of computing devices in the environment as well as remote cloud services accessible via a network.

DETAILED DESCRIPTION

Figure 1:
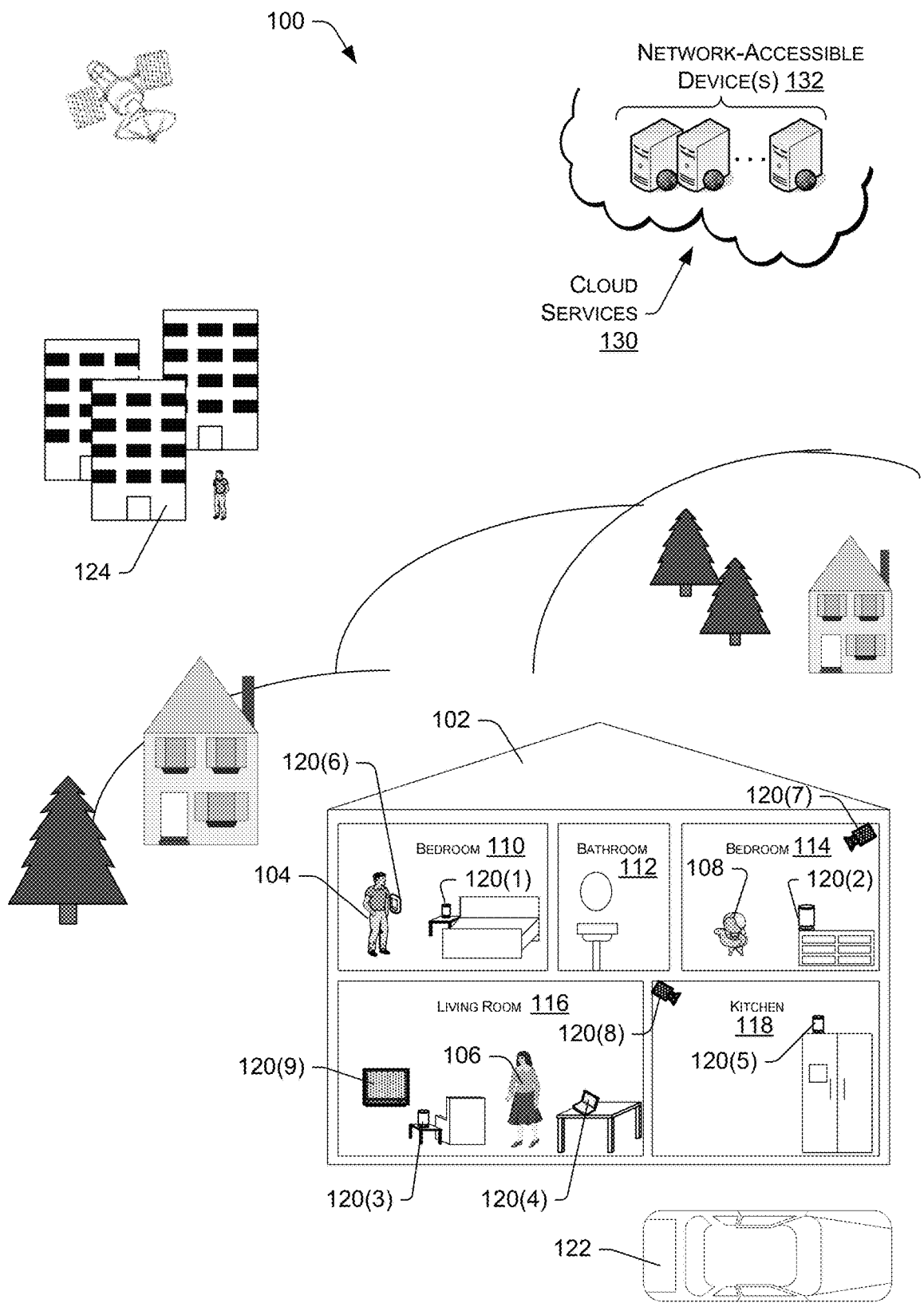
FIG. 1 illustrates an environment in which multiple computing devices, including voice controlled devices, are ubiquitous and coordinated to assist a person in handling routine tasks.

Described herein are techniques to leverage various computing devices to assist in routine tasks. As computing devices become ubiquitous in homes, offices, and other places, users are less likely to differentiate among them when thinking about and performing these routine tasks. The users will increasingly expect the devices to intelligently help, regardless of where the users are located and what the users might currently be doing. To implement this intelligence, a computing system is architected to organize task management across multiple devices with which the user may interact.

In one implementation, the computing system is constructed as a cloud service that uses a variety of implicit and explicit signals to determine presence of a user in a location and to decide which, if any, assistance or responses to provide to one or more devices within that location. The signals may represent any number of indicia that can help ascertain the whereabouts of the user and how best to interact with the person at that time, and at that location. Representative signals may include audio input (e.g., sound of a user's voice), how recently the user interacted with a device, presence of a mobile device associated with the user, visual recognition of the user, and so forth.

As one example scenario, suppose a user wants to remember to do a simple household chore or work task. The user may ask the computing system, via a first device, to remind him at a future time to do the household chore or work task. The computing system may then subsequently, at the future time, remind the user via a second device that is appropriate in the current circumstances to deliver that message. In this case, the computing system understands who is making the request, determines when to provide the reminder to the user, ascertains where the user is when it is time to remind him, discovers which devices are available to deliver the reminder, and evaluates which of the available devices is best to deliver the reminder. In this manner, the computing system implements response functionality that includes intelligent selection of endpoint devices.

The various operations to implement this intelligence may be split among local devices and remote cloud computing systems. In various implementations, different modules and functionality may reside locally in the devices proximal to the user, or remotely in the cloud servers. This disclosure provides one example implementation in which a significant portion of the response system resides in the remote cloud computing system.

Further, this disclosure describes the techniques in the context of local computing devices that are primarily voice operated, such as dedicated voice controlled devices. Receiving verbal requests and providing audible responses introduce some additional challenges, which the system described below is configured to address. However, use of voice controlled devices is not intended to be limiting as other forms of engaging the user (e.g., gesture input, typed input, visual output, etc.) may be used by the computing system.

Illustrative Architecture

FIG. 1 shows an illustrative architecture of a computing system 100 that implements response functionality with intelligent endpoint selection. For discussion purposes, the system 100 is described in the context of users going about their normal routines and interacting with the computing system 100 throughout the day. The computing system 100 is configured to receive requests given by users at respective times and locations, process those requests, and return responses at other respective times, to locations at which the users are present, and to appropriate endpoint devices.

In this illustration, a house 102 is a primary residence for a family of three users, including a first user 104 (e.g., adult male, dad, husband, etc.), a second user 106 (e.g., adult female, mom, wife, etc.), and a third user 108 (e.g., daughter, child, girl, etc.). The house is shown with five rooms including a master bedroom 110, a bathroom 112, a child's bedroom 114, a living room 116, and a kitchen 118. The users 104-108 are located in different rooms in the house 102, with the first user 104 in the master bedroom 110, the second user 106 in the living room 116, and the third user 108 in the child's bedroom 114.

The computing system 100 includes multiple local devices or endpoint devices 120(1), . . . , 120(N) positioned at various locations to interact with the users. These devices may take on any number of form factors, such as laptops, electronic book (eBook) reader devices, tablets, desktop computers, smartphones, voice controlled devices, entertainment device, augmented reality systems, and so forth. In FIG. 1, the local devices include a voice controlled device 120(1) residing in the bedroom 110, a voice controlled device 120(2) in the child's bedroom 114, a voice controlled device 120(3) in the living room 116, a laptop 120(4) in the living room 116, and a voice controlled device 120(5) in the kitchen 118. Other types of local devices may also be leveraged by the computing system, such as a smartphone 120(6) of the first user 104, cameras 120(7) and 120(8), and a television screen 120(9). In addition, the computing system 100 may rely on other user-side devices found outside the home, such as in an automobile 122 (e.g., car phone, navigation system, etc.) or at the first user's office 124 (e.g., work computer, tablet, etc.) to convey information to the user.

Each of these endpoint devices 120(1)-(N) may receive input from a user and deliver responses to the same user or different users. The input may be received in any number of ways, including as audio or verbal input, gesture input, and so forth. The responses may also be delivered in any number of forms, including as audio output, visual output (e.g., pictures, UIs, videos, etc. depicted on the laptop 120(4) or television 120(9)), haptic feedback (e.g., vibration of the smartphone 120(6), etc.), and the like.

The computing system 100 further includes a remote computing system, such cloud services 130 supported by a collection of network-accessible devices or servers 132. The cloud services 130 generally refer to a network-accessible platform implemented as a computing infrastructure of processors, storage, software, data access, and so forth that is maintained and accessible via a network, such as the Internet. Cloud services 130 may not require end-user knowledge of the physical location and configuration of the system that delivers the services. Common expressions associated with cloud services include "on-demand computing", "software as a service (SaaS)", "platform computing", "network accessible platform", and so forth.

The cloud services 130 coordinate request input and response output among the various local devices 120(1)-(N). At any one of the local devices 120(1)-(N), a user, such as the user 104, may enter a request for the computing system 100 to handle. This request may be a verbal request, such as the user 104 speaking to the voice controlled device 120(1) in the master bedroom 110. For instance, the user may say, "Please remind me to take out the garbage tomorrow morning." The voice controlled device 120(1) is equipped with microphones to receive the audio input and a network interface to pass the request to the cloud services 130. The local device 120(1) may optionally have natural language processing functionality to begin processing of the speech content.

The request is passed to the cloud services 130 over a network (not shown in FIG. 1) where the request is processed. The request is parsed and interpreted. In this example, the cloud services 130 determine that the user wishes to be reminded of the household chore to take out the garbage at a specified timeframe (i.e., tomorrow morning). The cloud services 130 implements a task handler to define a task that schedules a reminder to be delivered to the user at the appropriate time (e.g., 7:00 AM). When that time arrives, the cloud services 130 determine where the target user who made the request, i.e., the first user 104, is located. The cloud services 130 may use any number of techniques to ascertain the user's whereabouts, such as polling devices in the area to get an audio, visual, or other biometric confirmation of presence, or locating a device that might be personal or associated with the user (e.g., smartphone 120(6)), or through other secondary indicia, such as the user's history of activity, receipt of other input from the user from a specific location, and so forth.

Once the user is located, the cloud services 130 may then determine which local device is suitable to deliver the response to the user. In some cases, there may be only a single device and hence the decision is straightforward. However, in other situations, the user may be located in an area having multiple local devices, any one of which may be used to convey the response. In such situations, the cloud services 130 may evaluate the various candidate devices, and select the best or more appropriate device in the circumstances to deliver the response.

In this manner, the computing system 100 provides a coordinated response system that utilizes ubiquitous devices available in the user's environment to receive requests and deliver responses. The endpoint devices used for receipt of the request and deliver of the response may be different. Moreover, the devices need not be associated with the user in any way, but rather generic endpoint devices that are used as needed to interact with the user. To illustrate the flexibility of the computing system, the following discussion continues the earlier example of a user asking to be reminded to perform a household chore.

Figure 2:
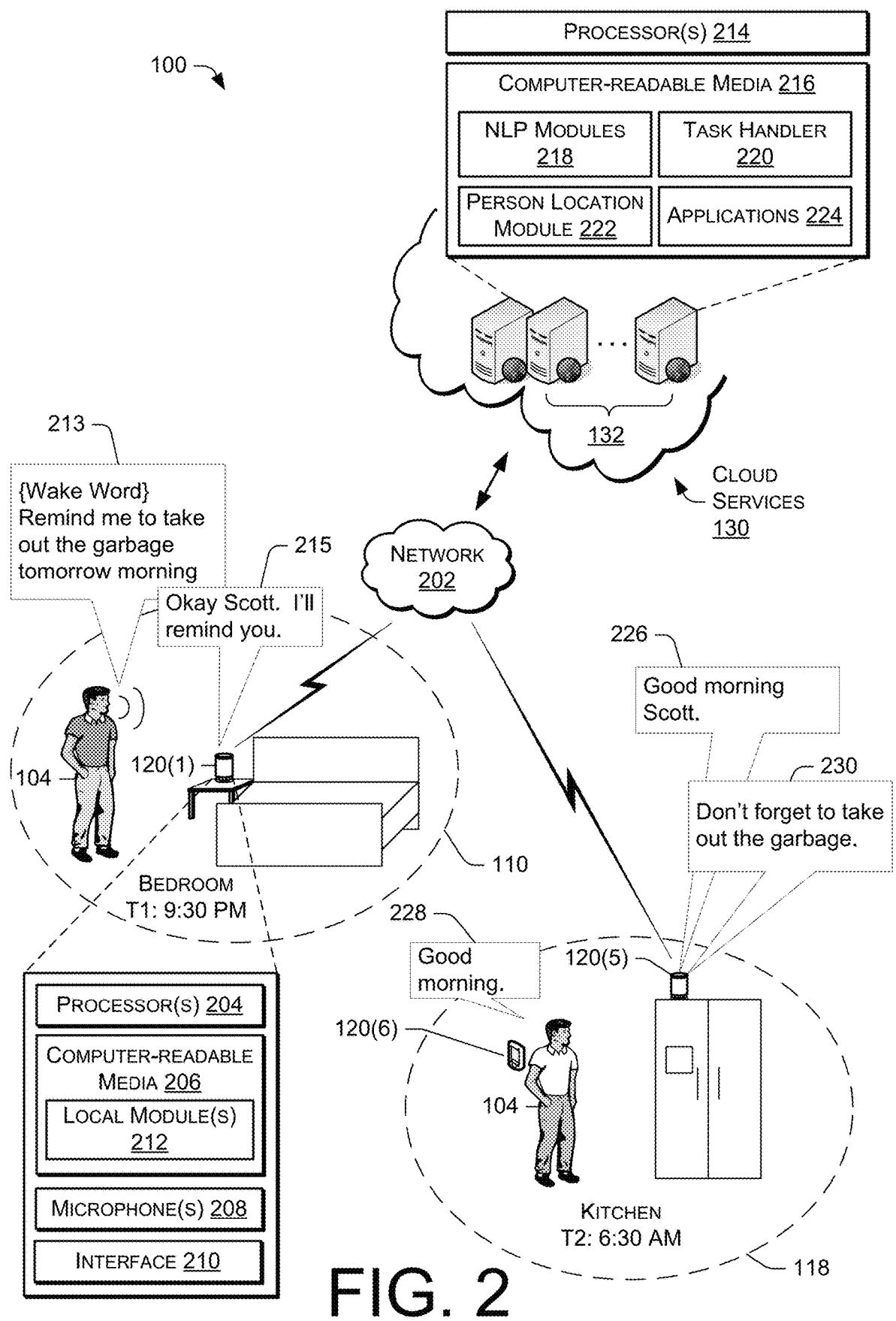
FIG. 2 shows a representative scenario of a person using the computing environment to assist with the task.

FIG. 2 illustrates select devices in the computing system 100 to show a representative scenario of a person using the computing environment to assist with the task. In this example, two endpoint devices are shown, with a first endpoint device in the form of the voice controlled assistant 120(1) residing in the bedroom 110 and the second endpoint device in the form of the voice controlled assistant 120(5) residing in the kitchen 118. The endpoint devices 120(1) and 120(5) are coupled to communicate with the remote cloud services 130 via a network 202. The network 202 may be representative of any number of network types, such as wired networks (e.g., cable, local area network (LAN), etc.) and/or wireless networks (e.g., Bluetooth™, radio frequency (RF), cellular, satellite, etc.).

Each endpoint or local device, as represented by the bedroom-based device 120(1), is equipped with one or more processors 204, computer-readable media 206, one or more microphones 208, and a network interface 210. The computer-readable media 206 may include volatile and nonvolatile memory, removable and non-removable media implemented in any method or technology for storage of information, such as computer-readable instructions, data structures, program modules, or other data.

Local program modules 212 are shown stored in the media 206 for execution by the processor(s) 204. The local modules 206 provide basic functionality to receive and process audio input received via the microphones 208. The functionality may include filtering signals, analog-to-digital conversion, parsing sounds or words, and early analysis of the parsed sounds or words. For instance, the local modules 212 may include a wake word recognition module to recognize wake words that are used to transition the voice controlled assistant 120(1) to an awake state for receiving input from the user. The local modules 212 may further include some natural language processing functionality to begin interpreting the voice input from the user.

To continue the above example, suppose the user 104 makes a request to the voice controlled assistant 120(1) in the bedroom 110 at a first time of 9:30 PM. The request is for a reminder to perform a household chore in the morning. In this example, the user 104 speaks a wake word to alert the device 120(1) and then verbally gives the request, "Remind me to take out the garbage tomorrow morning" as indicated by the dialog bubble 213. The microphone(s) 208 receive the audio input and the local module(s) 212 process and recognize the wake word to initiate other modules. The audio input may be parsed and partially analyzed, and/or packaged and sent via the interface 210 and network 202 to the cloud services 130.

The cloud services 130 include one or more network-accessible devices, such as servers 132. The servers 132 may include one or more processors 214 and computer-readable media 216. The processor(s) 214 and the computer-readable media 216 of the servers 132 are physically separate from the processor(s) 204 and computer-readable media 206 of the device 120(1), but may function jointly as part of a system that provides processing and memory in part on the device 120 and in part on the cloud services 130. These servers 132 may be arranged in any number of ways, such as server farms, stacks, and the like that are commonly used in data centers.

The servers 132 may store and execute any number of programs, data, applications, and the like to provide services to the user. In this example architecture, the servers 132 are shown to store and execute natural language processing (NLP) modules 218, a task handler 222, a person location module 224, and various applications 224. The NLP modules 218 process the audio content received from the local device 120(1) to interpret the request. If the local device is equipped with at least some NLP capabilities, the NLP modules 218 may take that partial results and complete the processing to interpret the user's verbal request.

The resulting interpretation is passed to the task handler 220 to handle the request. In our example, the NLP modules 218 interpret the user's input as requesting a reminder to be scheduled and delivered at the appropriate time. The task handler 220 defines a task to set a reminder to be delivered at a time period associated with "tomorrow morning". The task might include the contents (e.g., a reminder to "Don't forget to take out the garbage"), a time for delivery, and an expected location of delivery. The delivery time and expected location may be ascertained from secondary indicia that the service 130 aggregates and searches. For instance, the task handler 220 may consult other indicia to better understand what "tomorrow morning" might mean for this particular user 104. One of the applications 224 may be a calendar that shows the user has a meeting at the office at 7:30 AM, and hence is expected to leave the house 102 by 7:00 AM. Accordingly, the task handler 220 may narrow the range of possible times to before 7:00 AM. The task handler 220 may further request activity history from a user profile application (another of the applications 224) to determine whether the user has a normal morning activity. Suppose, for example, that the user has shown a pattern of arising by 6:00 AM and having breakfast around 6:30 AM. From these additional indicia, the task handler 220 may decide an appropriate time to deliver the reminder to be around 6:30 AM on the next day. Separately, the task handler 220 may further deduce that the user is likely to be in the kitchen at 6:30 AM the next day.

From this analysis, the task handler 220 sets a task for this request. In this example, a task is defined to deliver a reminder message at 6:30 AM on the next day to a target user 104 via an endpoint device proximal to the kitchen 118. That is, the task might be structured as including data items of content, date/time, user identity, default endpoint device, and default location. Once the request is understood and a task is properly defined, the cloud services 130 may return a confirmation to the user to be played by the first device 120(1) that received the request while the user is still present. For instance, in response to the request for a reminder 213, the cloud services 130 might send a confirmation to be played by the bedroom device 120(1), such as a statement "Okay Scott, I'll remind you", as shown by dialog bubble 215. In this manner, the user experience is one of a conversation with a computing system. The user casually makes a request and the system responds in conversation. The statement may optionally include language such as "tomorrow at 6:30 am in the kitchen" to provide confirmation of the intent and an opportunity for the user to correct the system's understanding and plan.

The person location module 222 may further be used to help locate the user and an appropriate endpoint device when the time comes to deliver the response. Continuing the example, the task handler 220 might instruct the person location module 222 to help confirm a location of the user 104 as the delivery time of 6:30 AM approaches. Initially, the person location module 222 may attempt to locate the user 104 by evaluating a location of a personal device that he carries, such as his smartphone 120(6). Using information about the location of the smartphone 120(6) (e.g., global positioning system (GPS) data, trilateration from cell towers, Wi-Fi™ base station proximity, etc.), the person location module 222 may be able to confirm that the user is indeed in the house 102. Since the default assumption is that the user will be in the kitchen 118, the person location module 222 may ask the local device 120(5) to confirm that the target user 104 is in the kitchen 118. In one implementation, the person location module 222 may direct the local device 120(5) to listen for voices and then attempt to confirm that one of them is the target user 104. For instance, the local device 120(5) may provide a greeting to the target user, using the user's name, such as "Good morning Scott" as indicated by dialog bubble 226. If the target user 104 is present, the user may answer "Good morning", as indicated by the dialog bubble 228. In an alternative implementation, the local device 120(5) may be equipped with voice recognition functionality to identify the target user by capturing his voice in the environment. As still another implementation, the person location module 222 may request a visual image from the camera 120(8) (See FIG. 1) in the kitchen to get a visual confirmation that the target user 104 is in the kitchen.

When the delivery time arrives, the task handler 220 engages an endpoint device to deliver the response. In this example, the task handler 220 contacts the voice controlled assistant 120(5) in the kitchen 118 to send the response. The content from the reminder task is extracted and sent to the device 120(5) for playback over the speaker. Here, at 6:30

AM, the voice controlled assistant audibly emits the reminder, "Don't forget to take out the garbage" as indicated by the dialog bubble 230.

As illustrated by this example, the computing system 100 is capable of receiving user input from one endpoint or local device 120, processing the user input, and providing a timely response via another endpoint or local device 120. The user need not remember which device he gave the request, or specify which device he receives the response. Indeed, it might be any number of devices. Instead, the user experience is enhanced by the ubiquity of the devices, and the user will merely assume that the computer-enabled assistant system intuitively listened to the request and provided a timely response.

In some situations, there may be multiple devices to choose from when delivering the reminder. In this situation, the cloud services 130 may involve evaluating the various devices to find a best fit for the circumstances. Accordingly, one of the applications 224 may be an endpoint device selection module that attempts to identify the best local endpoint device for engaging the user. One example scenario is provided next to illustrate possible techniques for ascertaining the best device.

Figure 3:
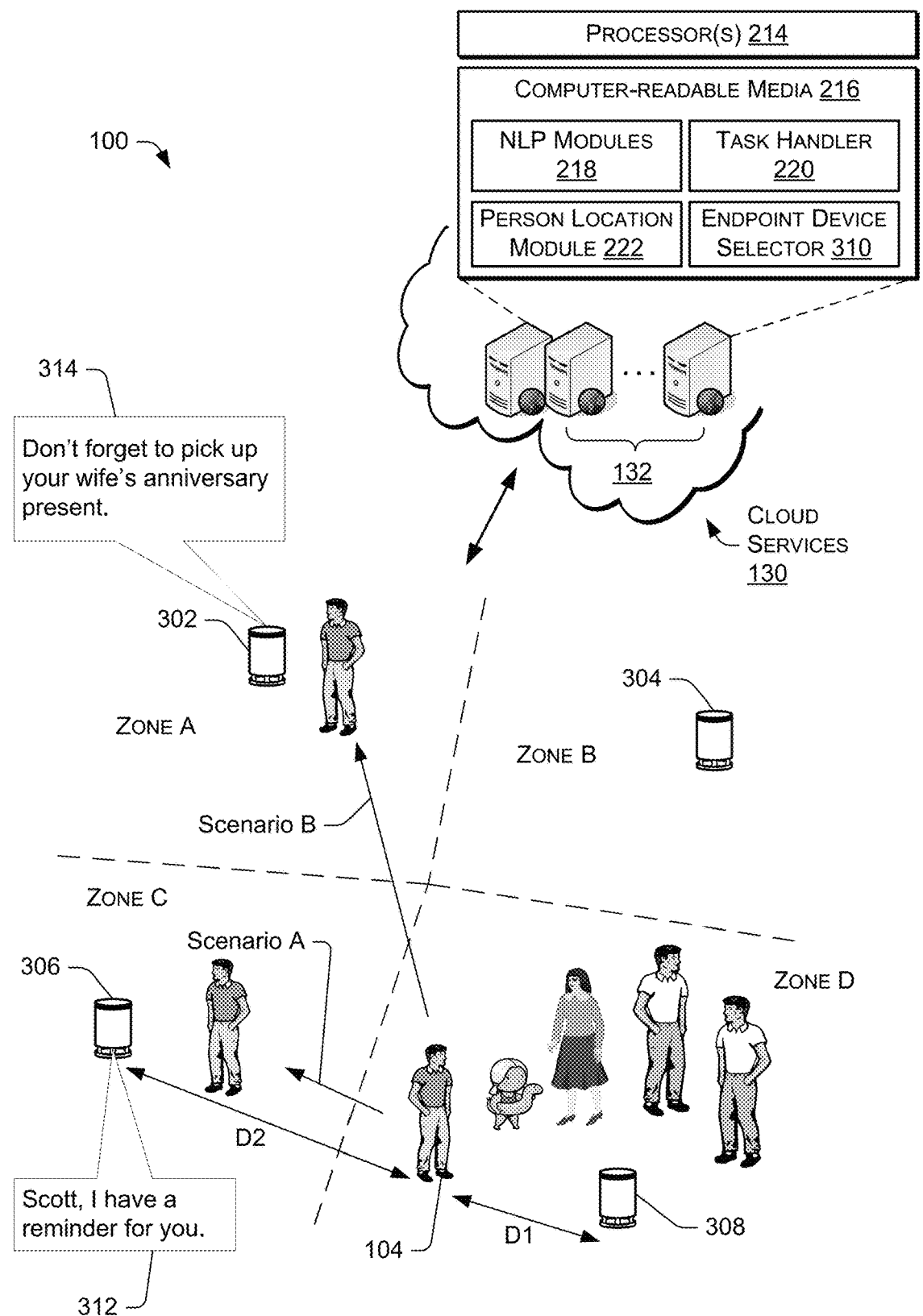
FIG. 3 shows how devices are selected to engage the person during performance of the task.

FIG. 3 shows how local endpoint devices are selected to engage the target person during performance of the task. In this illustration, four local endpoint devices 302, 304, 306, and 308 are shown in four areas or zones A-D, respectively. The zones A-D may represent different rooms, physical areas of a larger room, and so forth. In this example, the target user 104 is in Zone D. But, he is not alone. In addition, four other people are shown in the same zone D.

An endpoint device selector 310 is shown stored in the computer-readable media 216 for execution on the processor (s) 214. The endpoint device selector 310 is configured to identify available devices to engage the user 104, and then analyze them to ascertain the most appropriate device in the circumstances. Suppose, for discussion purposes, that anyone of the four devices 302-308 may be identified as "available" devices that are sufficient proximal to communicate with the user 104. There are many ways to determine available devices, such as detecting devices known to be physically in or near areas proximal to the user, finding devices that pick up audio input from the user (e.g., casual conversation in a room), devices associated with the user, user preferences, and so forth.

The endpoint device selector 310 next evaluates which of the available devices is most appropriate under the circumstances. There are several ways to make this evaluation. In one approach, a distance analysis may be performed to determine the distances between a device and the target person. As shown in FIG. 3, the voice controlled assistant 308 is physically closest to the target user 104 at a distance D1 and the voice controlled assistant 306 is next closest at a distance D2. Using distance, the endpoint device selector 310 may choose the closest voice controlled assistant 308 to deliver the response. However, physical proximity may not be the best in all circumstances.

Accordingly, in another approach, audio characteristics in the environment surrounding the user 104 may be analyzed. For instance, the signal-to-noise ratios are measured at various endpoint devices 302-308 to ascertain which one is best at hearing the user to the exclusion of other noise. As an alternative, the background volume may be analyzed to determine whether the user is in an area of significant background noise, such as the result of a conversation of many people or background audio from a television or appliance. Still another possibility is to analyze echo characteristics of the area, as well as perhaps evaluate Doppler characteristics that might be introduced as the user is moving throughout one or more areas. That is, verbal commands from the user may reach different devices in with more or less clarity and strength depending upon the movement and orientation of the user.

In still another approach, environment observations may be analyzed. For instance, a number of people in the vicinity may be counted based on data from cameras (if any) or recognition of distinctive voices. In yet another situation, a combination of physical proximity, sound volume-based determination, and/or visual observation may indicate that the closest endpoint device is actually physically separated from the target user by a structural impediment (e.g., the device is located on the other side of a wall in an adjacent room). In this case, even though the device is proximally the closest in terms of raw distance, the endpoint device selector 310 removes the device from consideration. These are but a few examples.

Any one or more of these analyses may be performed to evaluate possible endpoint devices. Suppose, for continuing discussion, that the endpoint device selector 310 determines that the noise level and/or number of people in zone D are too high to facilitate effective communication with the target user 104. As a result, instead of choosing the closest voice controlled assistant 308, the endpoint selector 310 may direct the voice controlled assistant 306 in zone C to communicate with the target user 104. In some instances, the assistant 306 may first attempt to get the user's attention by playing a statement to draw the user closer, such as "Scott, I have a reminder for you" as represented by the dialog bubble 312. In reaction to this message, the user 104 may move closer to the device 306 in zone C, thereby shrinking the distance D2 to a more suitable length. For instance, the user 104 may move from a first location in zone D to a new location in zone C as shown by an arrow labeled "scenario A". Thereafter, the task handler 220 may deliver the reminder to take out the garbage.

In addition, these techniques for identifying the most suitable device for delivering the response may aid in delivery of confidential or sensitive messages. For instance, suppose the target user 104 sets a reminder to pick up an anniversary gift for his wife. In this situation, the endpoint device selector 310 will evaluate the devices in and near the user's current location in an effort to identify a device that can deliver the reminder without the user's wife being present to hear the message. For instance, suppose the user 104 moves from zone D to zone A for a temporary period of time (as illustrated by an arrow labeled "scenario B"), thereby leaving the other people (and his wife) in zone D. Once the user is detected as being alone in zone A, the task handler 220 may direct the voice controlled assistant 302 to deliver the reminder response to the user. This is shown, for example, by the statement "Don't forget to pick up your wife's anniversary present" in dialog bubble 314.

Aspects of the system described herein may be further used to support real time communication between two people. For example, consider a scenario where one user wants to send a message to another user in real time. In this scenario, the first user may provide a message for delivery to the second user. For instance, the first user may speak a message to a first endpoint device, which sends the message to the cloud services for processing. The cloud services may then determine a location of the second user and select a second endpoint device that is available and suitable for delivery of the message to the second user. The message may then be presented to the second user via the second endpoint device.

Figure 4:
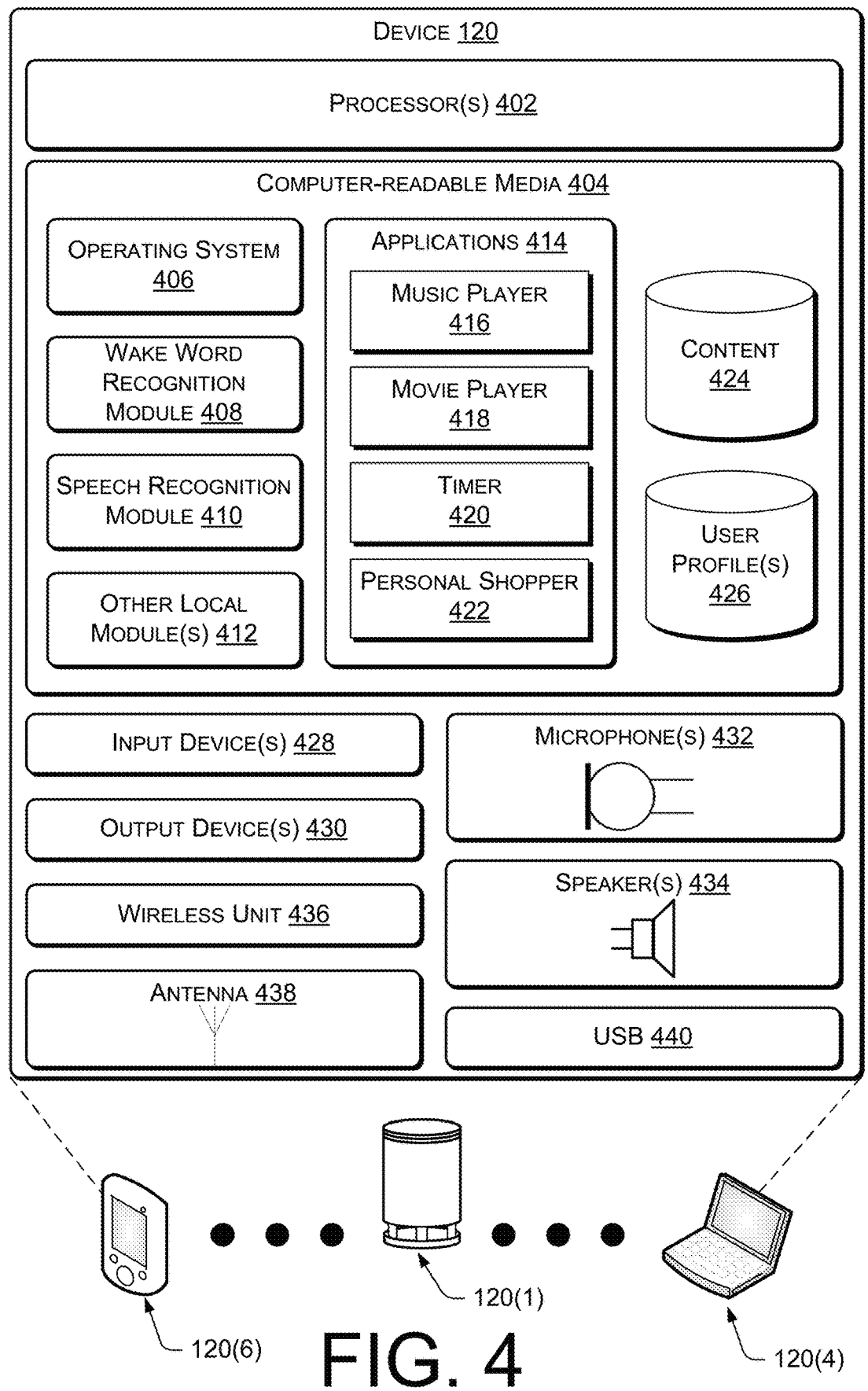
FIG. 4 shows a block diagram of selected components of computing devices that may be used in the environment.

FIG. 4 shows selected functional components of devices 120(1)-(N) that may be used in the computing environment. As noted in FIG. 1, the devices may be implemented in any number of ways and form factors. In this example, a device may be implemented as a standalone voice controlled device 120(1) that is relatively simple in terms of functional capabilities with limited input/output components, memory, and processing capabilities. For instance, the voice controlled device 120(1) does not have a keyboard, keypad, or other form of mechanical input. Nor does it have a display or touch screen to facilitate visual presentation and user touch input. Instead, the device 120(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 120(1) is through voice input and audible output.

The devices used in the system may also be implemented as a mobile device 120(6) such as a smartphone or personal digital assistant. The mobile device 120(6) may include a touch-sensitive display screen and various buttons for providing input as well as additional functionality such as the ability to send and receive telephone calls. Alternative implementations of the voice controlled device 100 may also include configuration as a computer, such as a laptop 120(4). The computer 120(4) may include a keyboard, a mouse, a display screen, and any other hardware or functionality that is typically found on a desktop, notebook, netbook, or other personal computing devices. The devices are merely examples and not intended to be limiting, as the techniques described in this disclosure may be used in essentially any device that has an ability to recognize speech input.

In the illustrated implementation, each of the devices 120 includes one or more processors 402 and computer-readable media 404. The computer-readable media 404 may include volatile and nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computing device. The computer-readable media 404 may be implemented as computer-readable storage media (CRSM), which may be any available physical media accessible by the processor(s) 102 to execute instructions stored on the memory 404. In one basic implementation, CRSM may include RAM and Flash memory. In other implementations, CRSM may include, but is not limited to, ROM, EEPROM, or any other tangible medium which can be used to store the desired information and which can be accessed by the processor(s) 402.

Several modules such as instruction, datastores, and so forth may be stored within the computer-readable media 404 and configured to execute on the processor(s) 402. A few example functional modules are shown as applications stored in the computer-readable media 404 and executed on the processor(s) 402, although the same functionality may alternatively be implemented in hardware, firmware, or as a system on a chip (SOC).

An operating system module 406 may be configured to manage hardware and services within and coupled to the device 120 for the benefit of other modules. A wake word recognition module 408 and a speech recognition module 410 may employ any number of conventional speech recognition techniques such as use of natural language processing and extensive lexicons to interpret voice input. For example, the speech recognition module 410 may employ general speech recognition techniques and the wake word recognition module may include speech or phrase recognition particular to the wake word. In some implementations, the wake word recognition module 408 may employ a hidden Markov model that represents the wake word itself. This model may be created in advance or on the fly depending on the particular implementation. In some implementations, the speech recognition module 410 may initially be in a passive state in which the speech recognition module 410 does not recognize or respond to speech. While the speech recognition module 410 is passive, the wake word recognition module 408 may recognize or respond to wake words. Once the wake word recognition module 408 recognizes or responds to a wake word, the speech recognition module 410 may enter an active state in which the speech recognition module 410 operates to detect any of the natural language commands for which it is programmed or to which it is capable of responding. While in the particular implementation shown in FIG. 4, the wake word recognition module 408 and the speech recognition module 410 are shown as separate modules; whereas in other implementations, these modules may be combined.

Other local modules 412 may also be present on the device, depending upon the implementation and configuration of the device. These modules may include more extensive speech recognition techniques, filters and echo cancellation modules, speaker detection and identification, and so forth.

The voice controlled device 100 may also include a plurality of applications 414 stored in the computer-readable media 404 or otherwise accessible to the device 120. In this implementation, the applications 414 are a music player 416, a movie player 418, a timer 420, and a personal shopper 422. However, the voice controlled device 120 may include any number or type of applications and is not limited to the specific examples shown here. The music player 416 may be configured to play songs or other audio files. The movie player 418 may be configured to play movies or other audio visual media. The timer 420 may be configured to provide the functions of a simple timing device and clock. The personal shopper 422 may be configured to assist a user in purchasing items from web-based merchants.

Datastores may also be stored locally on the media 404, including a content database 424 and one or more user profiles 426 of users that have interacted with the device 120. The content database 424 store various content that may be played or presented by the device, such as music, books, magazines, videos and so forth. The user profile(s) 426 may include user characteristics, preferences (e.g., user specific wake words), usage history, library information (e.g., music play lists), online purchase history, and other information specific to an individual user.

Generally, the voice controlled device 120 has input devices 428 and output devices 430. The input devices 428 may include a keyboard, keypad, mouse, touch screen, joystick, control buttons, etc. Specifically, one or more microphones 432 may function as input devices to receive audio input, such as user voice input. In some implementations, the input devices 428 may further include a camera to capture images of user gestures. The output devices 430 may include a display, a light element (e.g., a light emitting diode (LED)), a vibrator to create haptic sensations, or the like. Specifically, one a more speakers 434 may function as output devices to output audio sounds.

A user may interact with the device 120 by speaking to it, and the microphone 432 captures the user's speech. The device 120 can communicate back to the user by emitting audible statements through the speaker 434. In this manner, the user can interact with the voice controlled device 120 solely through speech, without use of a keyboard or display.

The voice controlled device 120 might further include a wireless unit 436 coupled to an antenna 438 to facilitate a wireless connection to a network. The wireless unit 436 may implement one or more of various wireless technologies, such as Wi-Fi™, Bluetooth™, RF, and so on. A universal serial bus (USB) port 440 may further be provided as part of the device 120 to facilitate a wired connection to a network, or a plug-in network device that communicates with other wireless networks. In addition to the USB port 440, or as an alternative thereto, other forms of wired connections may be employed, such as a broadband connection. In this manner, the wireless unit 436 and USB 440 form two of many examples of possible interfaces used to connect the device 120 to the network 202 for interacting with the cloud services 130.

Accordingly, when implemented as the primarily-voice-operated device 120(1), there may be no input devices, such as navigation buttons, keypads, joysticks, keyboards, touch screens, and the like other than the microphone(s) 432. Further, there may be no output such as a display for text or graphical output. The speaker(s) 434 may be the main output device. In one implementation, the voice controlled device 120(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 120(1) may be implemented as an aesthetically appealing device with smooth and rounded surfaces, with one or more apertures for passage of sound waves. The device 120(1) may merely have a power cord and optionally a wired interface (e.g., broadband, USB, etc.). Once plugged in, the device may automatically self-configure, or with slight aid of the user, and be ready to use. As a result, the device 120(1) may be generally produced at a low cost. In other implementations, other I/O components may be added to this basic model, such as specialty buttons, a keypad, display, and the like.

Illustrative Processes

Figure 5:
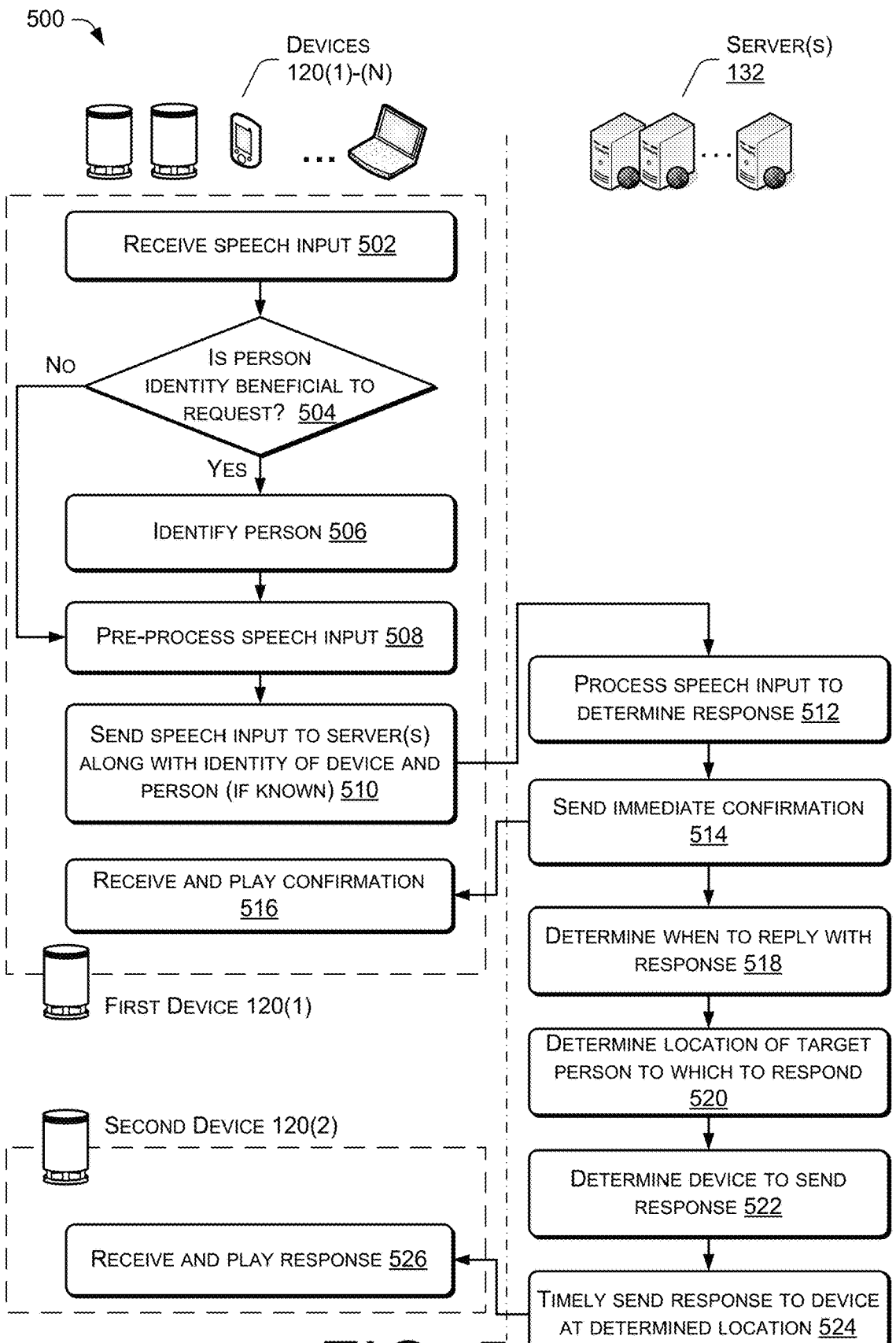
FIG. 5 is a flow diagram showing an illustrative process for aiding the person in performing a task, including receiving a request from the person via one device and delivering a response to the person via another device.

FIG. 5 shows an example process 500 for aiding a person in performing a task, including receiving a request from the person via one device and delivering a response to the person via another device. The process 500 may be implemented by the local endpoint devices 120(1)-(N) and server(s) 132 of FIG. 1, or by other devices. This process (along with the processes illustrated in FIGS. 6 and 7) is illustrated as a collection of blocks or actions in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

For purposes of describing one example implementation, the blocks are arranged visually in FIG. 5 in columns beneath the endpoint devices 120(1)-(N) and server(s) 132 to illustrate that these devices of the system 100 may perform these operations. That is, actions defined by blocks arranged beneath the devices 120(1)-(N) may be performed by any one of the devices. In certain situations, part of the process, such as the request input part, may be performed by a first endpoint device and another part of the process, such as the response delivery part, may be performed by a second endpoint device, as illustrated by the dashed boxes about portions of the flow diagram. Similarly, actions defined by blocks arranged beneath the server(s) 132 may be performed by one or more server(s) 132.

At 502, a first local endpoint device 120(1) receives speech input at the microphone(s) 208/434. The speech input may include a wake word to alert the device to intentional speech, or may be part of an ongoing discussion after the device is already awake and interacting with the user. The speech input includes a request.

At 504, the speech recognition module 410 at the first local endpoint device 120(1) attempts to discern whether the request in the speech input would benefit from knowing the identity of the person. Said another way, is the request general or more personal? If it is not personal (i.e., the "no" branch form 504) and person identity is not beneficial, the process 500 may proceed to some pre-processing of the speech input at 508. For instance, the speech input may be a question, "What is the weather today?" This request may be considered general in nature, and not personal, and hence the system need not remember who is making the request. On the other hand, the user may make a personal request (i.e., the "yes" branch from 504) where person identity is beneficial, leading to an operation to identify the person at 506. For instance, suppose the speech input is "please remind me to take out the garbage tomorrow morning" or "remind me to pick up my wife's anniversary present." Both of these are examples of personal requests, with the latter having a higher degree of sensitivity in how the reminder is conveyed. In these situations, the person is identified through use voice identification (e.g., person A is talking), interchange context (male voice asks to take out garbage while in master bedroom), secondary visual confirmation, and so forth.

At 508, the first device 120(1) may optionally pre-process the speech input prior to sending it to the server. For instance, the device may apply natural language processing to the input, or compression algorithms to compress the data prior to sending it over to the servers 132, or even encryption algorithms to encrypt the audio data.

At 510, the speech input is passed to the servers 132 along with an identity of the first device 120(1) and an identity of the person, if known from 506. The identity of the device 120(1) may be a serial number, a registration number or the like, and is provided so that the task handler operating at the servers 132 knows from where the user request originated.

In some cases, a response may be immediately returned to the first device 120(1), such as a response containing the current weather information. In some cases, the identity of the first device 120(1) may help confirm the identity of the user. Further, the user's use of the first device to make a particular request at a particular time of day may be recorded in the user's profile as a way to track habits or patterns in the user's normal course of the day. Further, when the person identity is associated with the first device 120(1), this association may be used in selecting a location and endpoint device through for delivery of responses to that identified user for a period of time shortly after receipt of the request, or for delivery of future responses. It is also noted that in some implementations, the identity of the person may be determined by the servers 132, rather than at the first device 120(1). In such implementations, the first device 120(1) passes audio data representative of the speech input from the person, and the servers 132 use the audio data and possibly other indicia to identify the person.

It is further noted that in some implementations, the user may set a reminder for another person. For instance, a first user (e.g., the husband Scott) may make a request for a second user (e.g., his wife, Elyn), such as "Please remind Elyn to pick up the prescription tomorrow afternoon". In this situation, the request includes an identity of another user, which the servers at the cloud services will determine who that might be, based on the user profile data.

At 512, the servers 132 at the cloud services 130 processes in the speech input received from the first endpoint device 120(1). In one implementation, the processing may include decryption, decompression, and speech recognition. Once the audio data is parsed and understood, the task handler 220 determines an appropriate response. The task handler may consult any number of applications to generate the response. For instance, if the request is for a reminder to purchase airline tickets tomorrow, the task handler may involve a travel application as part of the solution of discovering airline prices when providing the reminder response tomorrow. In addition, the cloud services 130 may also determine for whom the response is to be directed. The response is likely to be returned to the original requester, but in some cases, it can be delivered to another person (in which the location determination would be with respect to the second person).

At 514, an immediate confirmation may be optionally sent to indicate to the user that the request was received and will be handled. For instance, in response to a request for a reminder, the response might be "Okay Scott, I'll remind you." The servers 130 return the confirmation to the same endpoint device 120(1) from which the request was received. At 516, the first device 120(1) receives and plays the confirmation so that the user experience is one of a conversation, where the computing system heard the request and acknowledged it.

At 518, it is determined when to reply with a response. In one implementation, the task handler 220 discerns from the request an appropriate time to respond to the request. The user may use any number of ways to convey a desired answer. For instance, the user may ask for a reminder "before my company meeting" or "tomorrow morning" or at 5:00 PM on a date certain. Each of these has a different level of specificity. The latter is straightforward, with the task handler 220 setting a response for 5:00 PM. With respect to the two former examples, the task handler 220 may attempt to discern what "tomorrow morning" may be depending upon the request. If the request is for a reminder to "take out the garbage", the timeframe associated with "tomorrow morning" is likely the time when the user is expected to be home in the morning (e.g., say at 6:30 AM as discussed above). If the request is for a reminder to "meet with marketing", the timeframe for "tomorrow morning" may be more like to 9:00 AM or 10:00 AM. Finally, if the request is for "before my company meeting", the task handler 220 may consult a calendar to see when the "company meeting" is scheduled and will set a reminder for a reasonable time period before that meeting is scheduled to start.

At 520, a location of the target person is determined in order to identify the place to which the response is to be timely sent. For instance, as the time for response approaches, the person location module 222 determines where the user may be located in order to deliver a timely response. There are many ways to make this determination. A more detailed discussion of this action is described below with reference to FIG. 6. Further, the target user may be the initial requester or another person.

At 522, a device to which to send the response is determined. In one implementation, an endpoint device selector 310 evaluates possible devices that might be available and then determines which endpoint device might be best in the circumstances to send the response. There are many techniques for evaluating possible devices and discerning the best fit. A more detailed discussion of this action is provided below with reference to FIG. 7.

At 524, an appropriate response is timely sent to the best-fit device at the location of the target user. Suppose, for discussion purposes, the best-fit device is a different endpoint device, such as a second local device 120(2), than the device 120(1) from which the request was received.

At 526, the response is received and played (or otherwise manifested) for the target user. As shown in FIG. 5, the second device 120(2) receives the response, and plays it for the user who is believed to be in the vicinity. The response may be in any form (e.g., audio, visual, haptic, etc.) and may include essentially any type of message, reminder, etc. The response may be in an audio form, where it is played out through the speaker for the user to hear. With the continuing examples, the response may be "Don't forget to take out the garbage", or "You have your company meeting in 15 minutes".

The technique described above and illustrated in FIG. 5 is merely an example and implementations are not limited to this technique. Rather, other techniques for operating the devices 120 and servers 132 may be employed and the implementations of the system disclosed herein are not limited to any particular technique.

Figure 6:
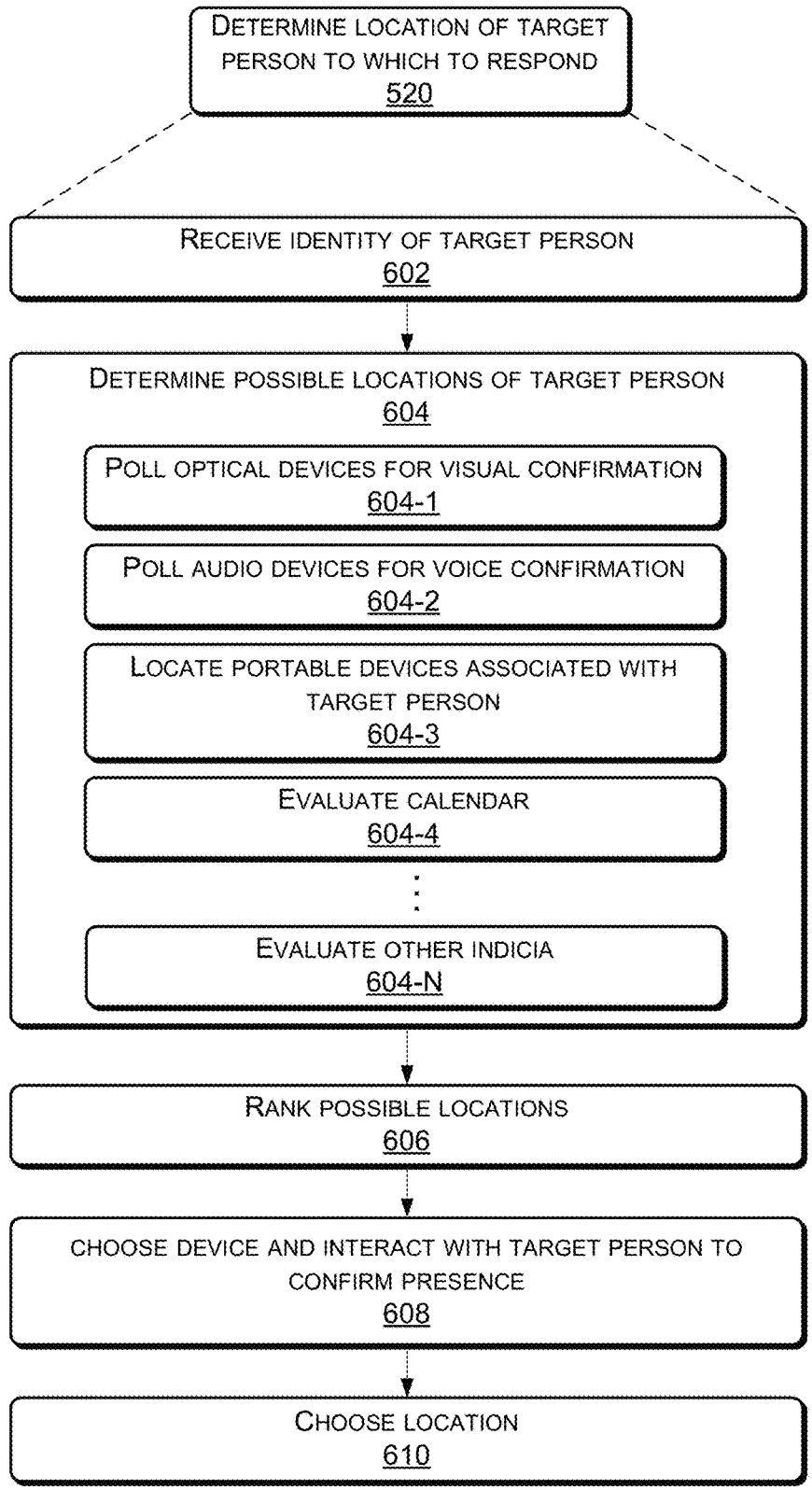
FIG. 6 is a flow diagram showing an illustrative process for determining a location of the person.

FIG. 6 shows a more detailed process for determining a location of the person, from act 520 of FIG. 5. At 602, an identity of the target person is received. As noted above with respect to act 506, certain requests will include an identity of the person making the request, such as a unique user ID.

At 604, possible locations of the target person are determined. There are many ways to make this determination, several of which are presented as representative examples. For instance, at 604-1, the person location module 222 might poll optical devices throughout an environment to attempt to visually locate the target person. The optical devices, such as cameras, may employ recognition software (e.g., facial recognition, feature recognition, etc.) to identify users. As used herein, "polling" refers to obtaining the optical information from the optical devices, which may involve actively requesting the information (e.g., a "pull" model) or receiving the information without request (e.g., a "push" model). In another approach, at 604-2, the person location module 222 may poll audio devices throughout the environment to gain voice confirmation that the target person is present. Audio tools may be used to evaluate audio input against pre-recorded vocal profiles to uniquely identify different people.

Another technique is to locate portable devices that may be associated with the target person, at 604-3. For instance, the person location module 222 may interact with location software modules that locate devices such as smartphones, tablets, or personal digital assistants via GPS data and/or cell tower trilateration data. In some implementations, this technique may be used in cooperation with other approaches. For instance, this physical location data may help narrow a search for a person to a particular residence or office, and then polling audio or optical devices may be used to place the user in particular rooms or areas of the residence or office.

The person location module 222 may further consult with other applications in an effort to locate the user, such as a calendar application, at 604-4. The calendar application may specify where the user is scheduled to be located at a particular time. This is particularly useful when the user is in various meetings at the office. There are many other sources that may be consulted to provide other indicia of the target person's whereabouts, as represented by 604-N.

Suppose the person location module 222 identifies multiple possible locations. At 606, the possible locations may be optionally ranked. For instance, each location may be assigned a confidence score indicating how likely the user is to be located there. Use of visual data may have a very high confidence score, whereas audio data has slightly less confidence associated with it. Use of a calendar item may have a significantly lower confidence score attached as there is no guarantee that the user is following the schedule.

At 608, the person location module 222 may engage one or more local devices to interact with the target person to confirm his or her presence. For instance, suppose the person location module 222 initially believes the person is in a particular room. The person location module 222 may direct one of the devices in the room to engage the person, perhaps through asking a question (e.g., "Scott, do you need anything?"). If the person is present, the person may naturally respond (e.g., "No, nothing. Thanks"). The person location module 222 may then confirm that the target person is present.

At 610, a location is chosen for delivery of the response to the user. The choice may be based on the ranked possible locations of action 606 and/or on confirmation through a quick interaction of action 608.

Figure 7:
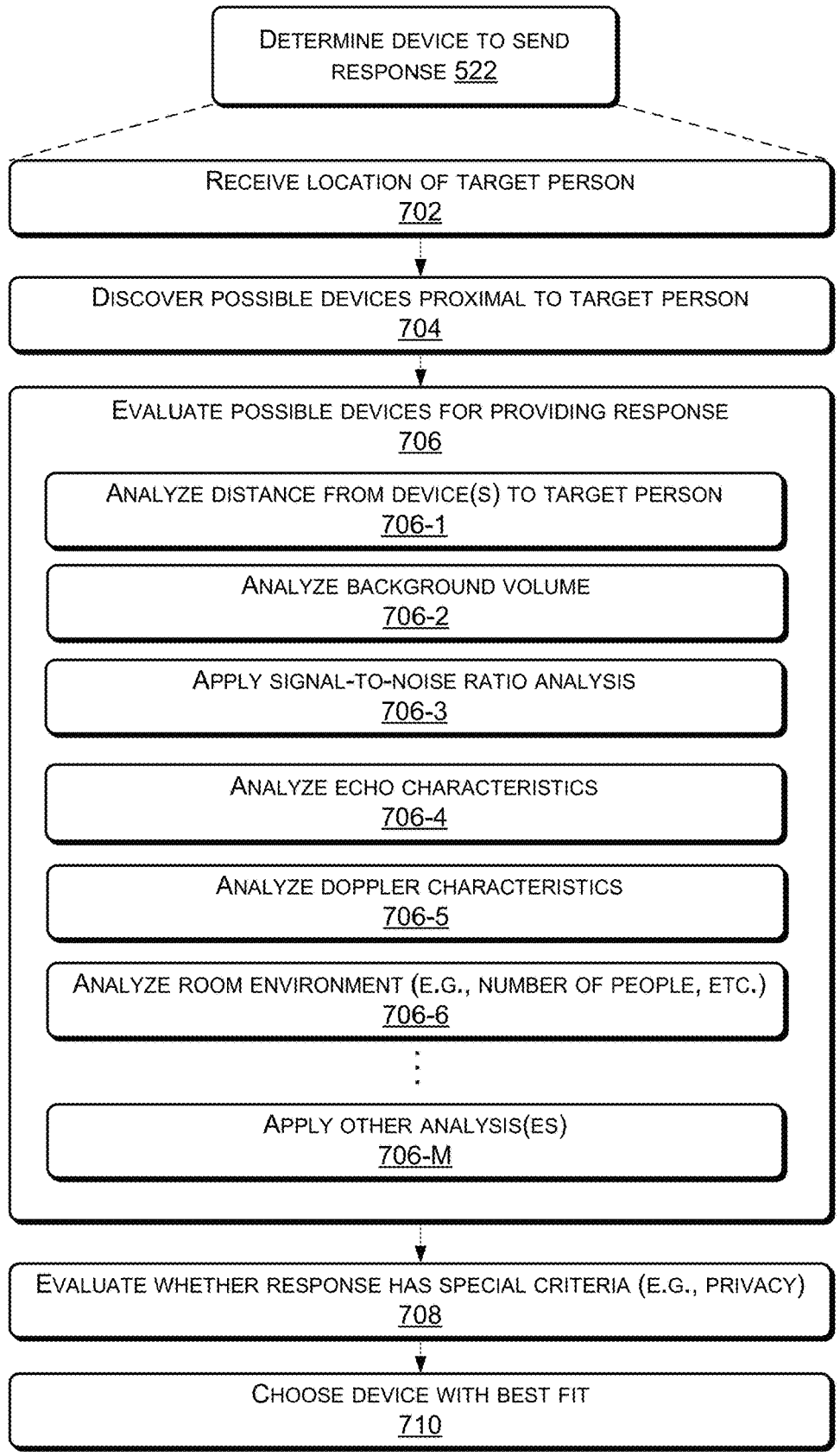
FIG. 7 is a flow diagram showing an illustrative process for determining a device to which to deliver the response to the person.

FIG. 7 shows a more detailed process for determining an appropriate device to return the response, from action 522 of FIG. 5.

At 702, the location of the target person is received. This may be determined from the action 516, as illustrated in FIG. 6. Alternatively, the location of the target person may be pre-known or the user may have informed the system of where he or she was located.

At 704, possible devices proximal to the location of the target person are discovered as being available to deliver the response to the person. For example, if the user is found to be located in a room of a home or office, the computing endpoint device selector 310 discovers whether one or more devices reside in the room of the house. The selector 310 may consult the user's profile to see what devices are associated with the user, or may evaluate registration records that identify a residence or location in which the device is installed.

At 706, the available devices are evaluated to ascertain which might be the best device in the circumstances to return a response to the target person. There are many approaches to make this determination, several of which are presented as representative examples. For instance, at 706-1, a distance from the endpoint device to the target person may be analyzed. If the endpoint device is equipped with depth sensors (e.g., time of flight sensors), the depth value may be used. If multiple devices are in a room, the timing difference of receiving verbal input from a user among the devices may be used to estimate the location of the person and which device might be closest.

At 706-2, the background volume in an environment containing the target person may be analyzed. High background volume may impact the ability of the device to communicate with the target user. For instance, suppose a room has a first device located near an appliance and a second device located across the room. If the appliance is operating, the background volume for the first device may be much greater than the background volume for the second device, thereby suggesting that the second device might be more appropriate in this case to communicate with the user.

At 706-3, the signal-to-noise ratios (SNRs) of various available devices are analyzed. Devices with strong SNRs are given a preference over those with weaker SNRs.

At 706-4, echo characteristics of the environment may be analyzed. A baseline reading is taken when the room is empty of humans and moving objects to get an acoustical map of the surrounding environment, including location of surfaces and other objects that might cause sound echo. The echo characteristics may be measured at the time of engagement with humans, including the target user, to determine whether people or objects might change the acoustical map. Depending upon the outcome of these measurements, certain available devices may become more appropriate for delivering the response to the target user.

At 706-5, Doppler characteristics of the environment, particularly with respect to the target user's movement through the environment, may be analyzed. In some cases, a user may be moving through an environment from one part of a room to another part of the room, or from room to room. In these cases, if the user is also speaking and conversing with the computing system 100, there may be changing acoustics that affect which devices are the best to interact with the user, depending upon the direction of the user's movement, and orientation of the user's head when speaking. The Doppler characteristics may therefore impact which device is may be best for responding in a given set of circumstances.

At 706-6, the environment may be analyzed, such as how many people are in the room, or who in particular is in the room, and so forth. In some implementations, visual data received from cameras or other optical devices may provide insights as to numbers of people, or identification of people in the environment. This analysis may assist in determining which device is most appropriate to deliver a response. For instance, if a device is located in a room crowded with people, the system may feel another device away from the crowd might be better.

There are many other types of analyses applied to evaluate possible devices for providing the response, as represented by 706-M. For instance, another type of analysis is to review ownership or registration information to discover an association between the target user and personal devices. Devices that are more personal to the target user may receive a higher score.

At 708, the response is evaluated to determine whether there are any special criteria that might impact a decision of where to direct the response. For instance, in the scenario where the user asked for a reminder to pick up his wife's present, the response will include an element of privacy or sensitivity in that the system should not return a reminder to a location where the target person's wife may accidentally hear the reminder. Another example is where the user may be requesting information about a doctor appointment or personal financial data, which is not intended for general consumption. There are myriad examples of special criteria. Accordingly, at 708, these criteria are evaluated and used in the decision making process of finding the best endpoint device under the circumstances.

At 710, the best endpoint device 120 is chosen. This decision may be based on scoring the various analyses 706-1 to 706-M, ranking the results, and applying any special criteria to the results. In this example, the device with the highest score in the end, will be chosen.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A computer-implemented method comprising:
receiving a request corresponding to input provided by a user;
generating first data associated with a response to the request;
receiving, from a first computing device, second data associated with a proximity of the user to the first computing device;
receiving, from a second computing device, third data associated with a proximity of the user to the second computing device;
determining, based at least on the second data and the third data, that the user is closer to the first computing device than to the second computing device;
determining, based at least in part on the user being closer to the first computing device than to the second computing device, that the response is to be sent to the first computing device; and
sending the first data associated with the response to the first computing device for presentation of the response to the user.

2. The computer-implemented method as recited in claim 1, wherein the second data further indicates at least a direction the user is moving while uttering the request and wherein determining that the response is to be sent to the first computing device is further based at least on in part the first computing device being located in the direction.

3. The computer-implemented method as recited in claim 1, wherein the request is received by a third computing device at a first location and the first computing device is at a second location different from the first location.

4. The computer-implemented method as recited in claim 1, wherein generating the first data associated with the response further comprises determining a time to send the first data associated with the response.

5. The computer-implemented method as recited in claim 4, further comprising:
accessing a user profile including a calendar of the user indicating at least one appointment of the user;
determining a venue of the at least one appointment of the user, the at least one appointment scheduled for a period including the time to send the first data associated with the response; and
determining that the venue of the at least one appointment is near the first computing device;
wherein determining that the response is to be sent to the first computing device is further based at least in part on the venue of the at least one appointment being near the first computing device.

6. The computer-implemented method as recited in claim 4, wherein determining the time to send the first data associated with the response further comprises at least one of:
determining, from the request, that the user has requested that the first data associated with the response be sent at a specific time;
accessing fourth data associated with a previous request from a user profile of the user; or
accessing fifth data associated with an activity pattern from the user profile of the user.

7. The computer-implemented method as recited in claim 1, further comprising:
determining that the first computing device is within a threshold distance of a location of the user, based on sensor data captured by a sensor of the first computing device;
wherein determining that the response is to be sent to the first computing device is further based at least in part on the first computing device being within the threshold distance of the location of the user.

8. The computer-implemented method as recited in claim 7, wherein the location of the user comprises at least one of an intersection of geographical coordinates, a position relative to at least one of the first computing device or the second computing device, or a distance from at least one of the first computing device or the second computing device.

9. The computer-implemented method as recited in claim 1, further comprising:
analyzing audio data, representing at least a voice of the user, captured by the first computing device; and
detecting that the user is within a threshold distance of the first computing device based at least in part on the audio data;
wherein determining that the response is to be sent to the first computing device is further based at least in part on the user being within the threshold distance.

10. The computer-implemented method as recited in claim 1, wherein determining that the response is to be sent to the first computing device further comprises:
analyzing visual data representing at least one image captured by the first computing device; and
determining that the user is represented in the at least one image.

11. The computer-implemented method as recited in claim 1, wherein:
the second data indicates a first distance between the user and the first computing device;
the third data indicates a second distance between the user and the second computing device; and
determining that user is closer to the first computing device than to the second computing device comprises determining that the first distance is lesser than the second distance.

12. The computer-implemented method as recited in claim 1, wherein:
the second data indicates a first time at which audio was detected by the first computing device;
the third data indicates a second time at which the audio was detected by the second computing device; and
determining that user is closer to the first computing device than to the second computing device comprises determining that the first time was earlier than the second time.

13. A system, comprising:
one or more processors; and
one or more computer-readable media having computer-executable instructions that, when executed by the one or more processors, cause the system to perform operations comprising:
receiving a request associated with input provided by a user;
generating first data associated with a response to the request;
receiving, from a first computing device, second data associated with a proximity of the user to the first computing device;
receiving, from a second computing device, third data associated with a proximity of the user to the second computing device;
determining, based at least on the second data and the third data, that the user is closer to the first computing device than to the second computing device;
determining, based at least in part on the user being closer to the first computing device than to the second computing device, that the response is to be sent to the first computing device; and
sending the first data associated with the response to the first computing device for presentation of the response to the user.

14. The system as recited in claim 13, wherein the second data further indicates at least a direction the user is moving while uttering the request and wherein determining that the response is to be sent to the first computing device is further based at least in part the first computing device being located in the direction.

15. The system as recited in claim 13, wherein the request is received from a third computing device at a first location and the first computing device is at a second location different from the first location.

16. The system as recited in claim 13, wherein generating the first data associated with the response further comprises determining a time to send the first data associated with the response.

17. The system as recited in claim 16, wherein the operations further comprise:
accessing a user profile including a calendar of the user indicating at least one appointment of the user;
determining a venue of the at least one appointment of the user, the at least one appointment scheduled for a period including the time to send the first data associated with the response; and
determining that the venue of the at least one appointment is near the first computing device;
wherein determining that the response is to be sent to the first computing device is further based at least in part on the venue of the at least one appointment being near the first computing device.

18. The system as recited in claim 16, wherein determining the time to send the first data associated with the response further comprises at least one of:
determining, from the request, that the user has requested that the first data associated with the response be sent at a specific time;
accessing fourth data associated with a previous request from a user profile of the user; or
accessing fifth data associated with an activity pattern from the user profile of the user.

19. The system as recited in claim 13, wherein:
the second data indicates a first distance between the user and the first computing device;
the third data indicates a second distance between the user and the second computing device; and
determining that user is closer to the first computing device than to the second computing device comprises determining that the first distance is lesser than the second distance.

20. The system as recited in claim 13, wherein:
the second data indicates a first time at which audio was detected by the first computing device;
the third data indicates a second time at which the audio was detected by the second computing device; and
determining that user is closer to the first computing device than to the second computing device comprises determining that the first time was earlier than the second time.

21. A system, comprising:
one or more processors; and
at least one computer-readable storage media storing computer-executable instructions, which when executed by the one or more processors cause the system to perform operations comprising:
receiving, from a first computing device, a request corresponding to input provided by a user to a user interface of the first computing device;
generating first data associated with a response to the request;
receiving, from a second computing device, second data associated with a proximity of the user to the second computing device;
receiving, from a third computing device, third data associated with a proximity of the user to the third computing device;
determining, based at least on the second data and the third data, that the user is closer to the second computing device than to the third computing device;
determining, based at least in part on the user being closer to the second computing device than to the third computing device, that the response is to be sent to the second computing device; and
sending the first data associated with the response to the second computing device for output via the user interface.

22. The system as recited in claim 21, wherein the computer-executable instructions cause the system to further perform operations comprising:
determining that the second computing device is within a threshold distance of a location of the user, based on sensor data captured by a sensor of the second computing device;
wherein determining that the response is to be sent to the second computing device is further based at least in part on the second computing device being within the threshold distance of the location of the user.

23. The system as recited in claim 22, wherein the location comprises at least one of an intersection of geographical coordinates, a position relative to at least one of the second computing device or the third computing device, or a distance from at least one of the second computing device or the third computing device.

24. The system as recited in claim 21, wherein the computer-executable instructions cause the system to further perform operations comprising:
   analyzing audio data, representing at least a voice of the user, captured by of the second computing device; and
   detecting that the user is within a threshold distance of the second computing device based at least in part on the audio data;
   wherein determining that the response is to be sent to the second computing device is further based at least in part on the user being within the threshold distance.

25. The system as recited in claim 21, wherein the second data further indicates at least a direction the user is moving while uttering the request and wherein determining that the response is to be sent to the second computing device is further based at least in part the second computing device being located in the direction.

26. The system as recited in claim 21, wherein:
   the second data indicates a first distance between the user and the second computing device;
   the third data indicates a second distance between the user and the third computing device; and
   determining that user is closer to the second computing device than to the third computing device comprises determining that the first distance is lesser than the second distance.

27. The system as recited in claim 21, wherein:
   the second data indicates a first time at which audio was detected by the second computing device;
   the third data indicates a second time at which the audio was detected by the third computing device; and
   determining that the user is closer to the second computing device than to the third computing device comprises determining that the first time was earlier than the second time.

* * * * *